Nov. 12, 1968           J. P. MANION           3,410,729
METHOD OF OPERATING A FUEL CELL ON HYDRAZINE
AND HYDROGEN PEROXIDE
Filed July 6, 1965
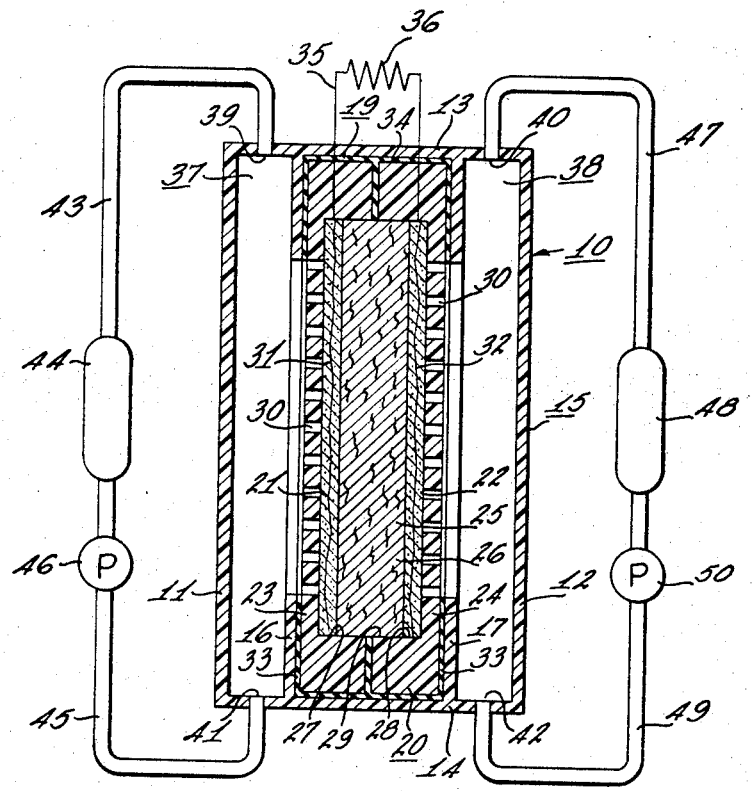
INVENTOR
JEAN P. MANION
BY
ATTORNEY 3,410,729
METHOD OF OPERATING A FUEL CELL ON HYDRAZINE AND HYDROGEN PEROXIDE
Jean P. Manion, Milwaukee, Wis., assignor to Allis-Chalmers Manufacturing Company, Milwaukee, Wis.
Filed July 6, 1965, Ser. No. 469,588
3 Claims. (Cl. 136—86)

ABSTRACT OF THE DISCLOSURE

A method of operating a fuel cell whereby hydrazine, or an aqueous solution thereof, is supplied as a fuel to an anode of nickel or carbon; and hydrogen peroxide, or an aqueous solution thereof, is supplied as an oxidant to a cathode of nickel or carbon.

---

This invention relates to a new combination of fuel and oxidant for fuel cells. More particularly, this invention relates to methods of obtaining electrical power directly from the chemical reaction of hydrogen peroxide and hydrazine in fuel cells.

The term fuel cell, as used herein, refers to those electrochemical devices that convert the free energy of a chemical reaction directly to electrical energy. Such devices are well known in the art and although there are differences between the design of various cells, a discussion of some of their common characteristics and problems will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode, there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$ for the overall chemical reaction at the fuel cell operating temperature. The amperage of the cell is determined by the rate of reaction and the size of the cell. The overall reaction rate is limited by the slowest half-cell reaction. Studies show that slow reaction in the hydrogen-oxygen fuel cell operating with alkaline electrolyte occurs at the cathode. I believe that substitution of hydrogen peroxide for oxygen at the cathode simplifies the kinetics, especially in my novel fuel-oxidant combination.

In practice, several individual fuel cells are coupled in cooperative electrical connection to obtain the desired output. A plurality of cells so connected is known as a module.

Prior to my discovery fuel cells commonly were powered by gaseous reactants. Although in a few instances one reactant has been a liquid.

I have discovered that the particular combination of hydrazine fuel with hydrogen-peroxide oxidant possesses peculiar advantages that make it especially attractive for transforming the energy of its reaction directly into electrical energy.

The foremost advantage of my novel combination of reactants is that both are liquids, and therefore they can conveniently be stored without either pressurization or occupying an inordinate amount of volume.

Another advantage of my combination of reactants is that it has a high power to weight ratio, an especially important feature when to supply the fuel cell with additional reactants is not feasible.

A still further advantage of my combination of reactants is that it can be used in conjunction with either acid, basic, or neutral electrolyte.

Another, perhaps more significant advantage of my combination is that the reactant is sufficiently reactive that special rare and costly catalysts, such as noble metals, are not required. That is to say, with this combination of reactants, electrodes consisting of nonnoble metals, such as nickel or carbon, are comparable to those catalyzed with noble metals in that they will effect current densities equal to those attainable with noble metals. On the other hand, nickel or carbon anodes are more effective than anodes catalyzed with noble metals in that the hydrazine fuel is more readily decomposed into nonuseful products in contact with the noble metal catalysts.

The novel features considered characteristic of my invention are set forth particularly in the appended claims. The invention itself both as to its construction and method of operation, together with additional objects and advantages will be best understood from the following description of specific embodiments when read in conjunction with the accompanying drawing, in which is shown a schematic cross-sectional view of a fuel cell especially designed for operation with my process.

Referring now in particular to the drawing, the process of my invention will be illustrated. Fuel cell 10 comprises cell assembly 20 mounted within housing 11. Assembly 20 itself comprises liquid permeable electrodes 21, 22 mounted in suitable backing plates 23, 24. Electrodes 21, 22 are spaced by an electrolyte containment means 25 carrying an electrolyte 26.

Electrodes 21, 22 can be made from any suitable porous electrically conductive material such, for example, as carbon or sintered nickel that is inert to destructive chemical reaction with the reactants, electrolyte, or products of reaction. The choice of the specific electrode material is determined in part by the electrolyte used. Those skilled in the art are aware of the advantages of various electrode material and it would be apparent that nickel electrodes, although suitable with a caustic electrolyte, are quite unsuitable in acide electrolytes.

Preferred electrodes have a gross porosity of between 10–20%. When the electrode is constructed of porous nickel, it is convenient to compress, by rolling or otherwise, a sintered nickel sheet by a factor of about 3 to provide an electrode having a thickness of about 20 mils.

Electrode 21 is mounted in a first peripherial seat 27 of a backing plate 23, and electrode 22 is mounted within a first peripherial seat 28 of backing plate 24. Plates 23, 24 are of identical construction and when abutted in face to face relation cooperate to form a second peripherial seat 29 to receive electrolyte containment means 25. The details concerning means 25 will be later explained. Each plate 23, 24 has a plurality of holes 30 therethrough to provide for the freeflow of reactants to and from electrodes 21, 22. Plate 23 like plate 24 is included in assembly 20 to add rigidity to electrodes 21, 22 and is preferably made from an inert non-conductive material.

Means 5 can comprise, for example, a container for free electrolyte, a matrix to hold electrolyte within its interstices, or an ion exchange membrane. In the illustrated preferred embodiment, means 25 is shown as a fibrous material having high capillary potential. Such fibrous material can be spun fibrous polypropylene or asbestos, although in our experience asbestos is the preferred fibrous material. Means 25 is positioned between electrodes 21, 22 being mounted in seat 29 after assembly, means 25 is compressed against the electrodes 21, 22 in sealing engagement.

Electrolyte 26 is carried by means 25. Suitable electrolytes are those materials that at the temperature of operation, do not decompose, and are capable of transporting ionic charge. Generally speaking, aqueous solutions of inorganic compounds that strongly ionize are preferred, such as the alkali hydroxides, and the so-called mineral acids like sulfuric acid.

During assembly of the cell, electrolyte containment means 25, if a fibrous membrane, is saturated with electrolyte such, for example, as potassium hydroxide having a concentration of between 30 to 38% potassium hydroxide by weight. It is to be understood that the performance of my invention is not limited to this range or to this electrolyte. The volume of electrolyte is predetermined so that when the cell is assembled and electrolyte containment means 25 is compressed into adherent contact with the porous electrodes 21, 22 some electrolyte is forced from the membrane into contact with the electrodes. The electrolyte 26, however, does not completely saturate the electrodes but does penetrate about one-third of the way into the porous electrode structure to form what are known as electrolyte fronts or reaction boundary interfaces 31, 32. At interfaces 31, 32 electrochemical reactions occur. The remainder of the space within the electrodes 21, 22 provides for the entry of the liquid reactants.

Housing means 15, mounting assembly 20, comprises end walls 11, 12 and a top and bottom 13, 14. There are inwardly turned flanges 16, 17 extending from the top and bottom and the side walls not shown. Assembly 20 is held in sealing engagement between flanges 16, 17 by clamping means placed at suitable intervals about the periphery of housing 15.

A gas tight seal is maintained between assembly 20 and flanges 16, 17 by sealing means 19 which can be a rubber gasket. Likewise, the abutting faces of plates 23, 24 are sealed about flanges 16, 17 by means 33 and assembly 20 is sealed within seats 21, 22 and 25 by means 34.

If electrode backing plates 23, 24 are electrically conductive, sealing means 34 should also be electrically nonconductive to thereby prevent shortcircuiting between electrodes 21, 22. External circuit 35 connects the electrodes to a load 36. The end walls 11, 12 are spaced apart from electrodes 21, 22 so as to provide reactant cavities 37, 38 adjacent each electrode.

The reactant cavities 37, 38 have inlets 39, 40 and outlets 41, 42. Reservoir 44 is connected to inlet 39 of cavity 37 by means of conduit 43, and to the outlet 41 by means of conduit 45. Included in conduit 45 is a pumping means 46 for circulating the fuel supplied from reservoir 44 to cavity 37, and returning unspent fuel to reservoir 44.

Similarly, conduit 47 connects outlet 40 of cavity 38 to reservoir 48, and conduit 49 connects outlet 42 to reservoir 48. Also, pumping means 50 for circulating oxidant is included in conduit 49.

The reactant cavities 37, 38 have inlets 39, 40 and outlets 41, 42. Referring to cavity 37, conduit 43 connects a reservoir 44 to inlet 39, and conduit 45 connects outlet 41 to reservoir 44. Included outside cavity 37 and between outlet 41 and inlet 39 is pumping means 46 for circulating fuel.

Similarly conduit 47 connects outlet 40 of cavity 38 to reservoir 48, and conduit 49 connects outlet 42 to reservoir 48. Also, a second pumping means 50 for circulating oxidant.

During the operation hydrazine preferably in aqueous solution is fed from reservoir 44 into reactant cavity 37. At the same time, hydrogen peroxide from reservoir 48 is fed into reactant cavity 38. I prefer using hydrazine and hydrogen peroxide in dilute solutions because of their extreme reactivity toward one another and their propensity to decompose in pure form. One should understand, however, that the concentrations of fuel and oxidant chosen affect only the efficiency of my process and do not detract from the invention itself. As will be noted later, the electrochemical efficiency based on hydrazine or on hydrogen peroxide increases as the concentration of each in the aqueous solution is decreased.

In each cavity 37, 38, the liquid reactants diffuse through holes 35 in backing plates 24, 25, and then penetrate into the porous electrode until they reach the electrolyte boundary interfaces 31, 32.

At the anode the following reaction is thought to occur 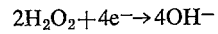 $N_2H_4 + 4OH^- \rightarrow N_2 + 4H_2O + 4e^-$, while at the cathode the following reaction is believed to take place $$2H_2O_2 + 4e^- \rightarrow 4OH^-$$

The overall cell reaction is then $$N_2H_4 + 2H_2O_2 \rightarrow 4H_2O + N_2$$

These reactions are, of course, written for reaction in a basic electrolyte.

The following specific examples will serve to further illustrate my invention.

EXAMPLE 1

To illustrate the operation of my invention in various electrolytes, a cell of the type shown in the drawing was constructed. The electrodes were made from porous carbon each having an area of 16 cm$^2$; the fuel was 64% $N_2H_4$ in aqueous solution and the oxidant 50% $H_2O_2$ in aqueous solution. The results with potassium hydroxide, hydrochloric acid, and sodium chloride are reported in Table I.

TABLE I

| Voltage | Current (amperes) |
|---|---|
| 25% KOH aqueous solution | Electrolyte |
| 0.4 | 0.0 |
| 0.33 | 0.030 |
| 0.28 | 0.050 |
| 0.20 | 0.100 |
| 23% HCl aqueous solution | Electrolyte |
| 0.87 | 0.0 |
| 0.80 | 0.100 |
| 0.65 | 0.200 |
| 0.58 | 0.250 |
| 0.53 | 0.300 |
| 0.43 | 0.350 |
| 25% NaCl aqueous solution | Electrolyte |
| 0.93 | 0.0 |
| 0.84 | 0.050 |
| 0.75 | 0.100 |
| 0.60 | 0.200 |
| 0.49 | 0.230 |
| 0.40 | 0.270 |

EXAMPLE 2

To illustrate the output as a function of hydrazine concentration, a cell of the type used in Example 1 was again used except this cell had porous nickel electrodes 1 inch$^2$ produced by rolling sintered nickel from 60 mils to 24 mils. The electrolyte was 25% KOH aqueous, and the $H_2O_2$ was a 50% aqueous solution, the hydrazine concentration being varied as shown in Table II.

presumably is ultimately lost by chemical reaction with hydrogen peroxide which has migrated through the cath-

TABLE II

| 95% $N_2H_4$ | | 64% $N_2H_4$ | | 50% $N_2H_4$ | | 25% $N_2H_4$ | | 10% $N_2H_4$ | | 5% $N_2H_4$ | | 2.5% $N_2H_4$ | |
|---|---|---|---|---|---|---|---|---|---|---|---|---|---|
| Voltage | Current (ma.) | Voltage | Current (ma.) | Voltage | Current (ma.) | Voltage | Current (ma.) | Voltage | Current (ma.) | Voltage | Current (ma.) | Voltage | Current (ma.) |
| 0.99 | 0 | 0.92 | 0 | 0.95 | 0 | 0.92 | 0 | 0.86 | 0 | 0.88 | 0 | 0.84 | 0 |
| 0.90 | 85 | 0.85 | 88 | 0.90 | 67 | 0.85 | 92 | 0.80 | 160 | 0.85 | 67 | 0.80 | 68 |
| 0.85 | 250 | 0.80 | 250 | 0.85 | 250 | 0.80 | 210 | 0.75 | 260 | 0.80 | 210 | 0.75 | 110 |
| 0.80 | 400 | 0.75 | 400 | 0.80 | 410 | 0.75 | 340 | 0.70 | 345 | 0.75 | 300 | 0.70 | 160 |
| 0.75 | 550 | 0.70 | 520 | 0.75 | 525 | 0.70 | 430 | | | | | | |
| 0.70 | [1] 750 | 0.65 | 600 | 0.70 | 660 | 0.65 | 480 | 0.65 | 410 | 0.70 | 410 | 0.60 | 210 |
| 0.65 | 840 | 0.60 | 700 | 0.65 | 800 | 0.60 | 550 | 0.60 | 490 | 0.65 | 500 | 0.50 | 370 |
| 0.60 | 1,050 | 0.50 | 880 | 0.60 | 900 | 0.50 | 660 | 0.50 | 600 | 0.60 | 550 | 0.45 | 450 |
| 0.55 | 1,200 | 0.45 | 930 | 0.50 | 1,000 | 0.35 | 860 | 0.86 | 0 | 0.50 | 700 | 0.76 | 0 |
| 0.85 | 0 | 0.86 | 0 | 0.86 | 0 | 0.87 | 0 | | | 0.78 | 0 | | |

[1] 108 amp./ft.[2]

EXAMPLE 3

To illustrate the output as a function of hydrogen peroxide concentration, a cell of the type used in Example II was used, but the fuel was 64% hydrazine, the hydrogen peroxide being varied as shown in Table III.

ode electrode. Under comparable fuel cell operating conditions, porous nickel containing platinum or palladium catayst results in an average of 50% more non-electrochemical decomposition. The advantages of the low poros-

TABLE III

| 50% $H_2O_2$ | | 25% $H_2O_2$ | | 10% $H_2O_2$ | | 5% $H_2O_2$ | | 2.5% $H_2O_2$ | |
|---|---|---|---|---|---|---|---|---|---|
| Voltage | Current (ma.) | Voltage | Current (ma.) | Voltage | Current (ma.) | Voltage | Current (ma.) | Voltage | Current (ma.) |
| (0.81) | 0 | 0.93 | 0 | 0.91 | 0 | 0.95 | 0 | 0.90 | 0 |
| 0.80 | 161 | 0.90 | 38 | 0.90 | 34 | 0.90 | 23 | 0.80 | 29 |
| 0.75 | 240 | 0.85 | 140 | 0.85 | 150 | 0.80 | 140 | 0.70 | 55 |
| 0.70 | [1] 445 | 0.80 | 240 | 0.80 | 200 | 0.70 | 200 | | |
| 0.65 | 630 | 0.75 | 300 | 0.75 | 250 | | | | |
| 0.60 | 800 | 0.70 | 350 | 0.70 | 270 | 0.60 | 250 | | |
| 0.55 | [2] 1,110 | 0.65 | 370 | 0.60 | 340 | 0.50 | 280 | | |
| | | 0.60 | 430 | 0.50 | 400 | | | | |
| | | 0.50 | 520 | 0.35 | 550 | 0.40 | 300 | | |
| | | 0.42 | 650 | 0.83 | 0 | 0.30 | 350 | | |
| | | 0.83 | 0 | | | 0.83 | 0 | | |

[1] 68 amp./ft.[2]   [2] −166 amp./ft.[2]

EXAMPLE 4

To illustrate the variation in current efficiency as a function of hydrazine concentration a cell of the type used in Example II was used. The hydrogen peroxide concentration was maintained at 50% and the fuel varied as indicated in Table IV. The current efficiency based on hydrazine was calculated by comparing the experimental quantity A, which is the total hydrazine which disappeared from the anode compartment with B the amount calculated from the equation, $$N_2H_4 + 4OH^- \rightarrow N_2 + 4H_2O + 4e^-$$

The experimental time and cell current used are required to calculate the quantity B and are also indicated in Table IV. As hydrazine concentration is decreased from 51% to 5%, the current efficiency based on total hydazine decomposed is almost doubled, 38% and 46% at cell currents of 300 and 600 milliamperes to 70.8% and 72% respectively.

The sources of hydrazine loss leading to the observed current efficiencies of less than 100% have been identified as catalytic non-electrochemical decomposition of the hydrazine on the anode electrode and migration of hydrazine through the electrode into the electrolyte where it ity electrode and of the elimination of the need for noble metal catalyst on the electrodes are readily apparent.

TABLE IV.—EFFECT OF HYDRAZINE CONCENTRATION ON COULOMBIC YIELD

Conditions: 25% aqueous KOH solution electrolyte; 50% aqueous $H_2O_2$ cathode reactant.
Cathode electrode: 60 mil porous nickel sheet mill-rolled to 15 mil thick.
Anode electrode: Two 0.060″ porous nickel sheets separated by a 150 mesh nickel screen and rolled to 0.037″.

| Cell Current (ma.) | Percent aqueous $N_2H_4$ used as anode reactant | A<br>Grams of $N_2H_4$ decomposed | B<br>Grams of $N_2H_4$ used electro-chemically | Coulombic Yield, percent $\left(\frac{B}{A} \times 100\right)$ |
|---|---|---|---|---|
| 300 | 51 | 0.120 | 0.046 | 38.3 |
| 600 | 51 | 0.200 | 0.092 | 46.0 |
| 300 | 5 | 0.065 | 0.046 | 70.8 |
| 500 | 5 | 0.106 | 0.077 | 72.7 |

Immaterial variations of my invention will become apparent to those skilled in the art upon reading the foregoing specification and such variations, together with numerous other advantages, will be understood do not constitute a departure from the underlying principle or idea of my invention within the scope of the appended claims.

The embodiments of the invention in which an exclusive property or privilege is claimed are defined as follows:

1. The method of producing electrical power directly from a chemical reaction in a fuel cell in a type having an anode and cathode mounted in a housing and spaced by an electrolyte, the steps comprising providing a porous anode and cathode consisting essentially of a conductive element selected from the group consisting of nickel and carbon, causing said electrolyte to partially diffuse into said porous anode and said porous cathode forming an electrolyte boundary interface within said anode and said cathode, supplying hydrazine to the anode, diffusing said hydrazine through said porous anode until it reaches said electrolyte boundary interface, at the same time supplying hydrogen peroxide to the cathode, diffusing said hydrogen peroxide through said porous cathode until it reaches said electrolyte boundary interface, and electrochemically reacting said hydrazine and said hydrogen peroxide.

2. The method according to claim 1 in which said hydrazine is supplied in an aqueous solution.

3. The method according to claim 1 in which said hydrogen peroxide is supplied in an aqueous solution.

References Cited

FOREIGN PATENTS 938,920   10/1963   Great Britain.

OTHER REFERENCES

Campa et al., Basic studies on fuel cell systems, in "Electrochemical Conversion Devices," ASTIA, A.D. 299,415, April 1963 (only p. 61 relied upon).

Franke et al., Fourth status report on fuel cells, in ASTIA, AD28686, July 1963 (only pp. 27, 44 and 63 relied upon).

ALLEN B. CURTIS, *Primary Examiner.*